(12) United States Patent
Mann et al.

(10) Patent No.: US 9,728,907 B2
(45) Date of Patent: Aug. 8, 2017

(54) INTERCONNECT ASSEMBLY

(71) Applicant: Hewlett-Packard Development Company, L.P., Houston, TX (US)

(72) Inventors: James M. Mann, Houston, TX (US); Robin Castell, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/764,859

(22) PCT Filed: Mar. 19, 2013

(86) PCT No.: PCT/US2013/032882
§ 371 (c)(1),
(2) Date: Jul. 30, 2015

(87) PCT Pub. No.: WO2014/149033
PCT Pub. Date: Sep. 25, 2014

(65) Prior Publication Data
US 2015/0380876 A1    Dec. 31, 2015

(51) Int. Cl.
| H01R 13/66 | (2006.01) |
| G06K 7/10 | (2006.01) |
| H04W 12/08 | (2009.01) |
| H04W 76/02 | (2009.01) |
| H04L 29/06 | (2006.01) |

(52) U.S. Cl.
CPC ..... *H01R 13/6691* (2013.01); *G06K 7/10237* (2013.01); *H04W 12/08* (2013.01); *H04W 76/02* (2013.01); *H04L 69/18* (2013.01)

(58) Field of Classification Search
CPC ................... H01R 13/6691; H04L 69/08
See application file for complete search history.

(56) References Cited

U.S. PATENT DOCUMENTS

| 6,950,859 B1 | 9/2005 | Bartek et al. |
| 7,127,541 B2 | 10/2006 | Govindarajulu et al. |
| 7,319,682 B2 | 1/2008 | Parry |
| 7,366,799 B2 | 4/2008 | Reddy et al. |
| 2010/0205450 A1* | 8/2010 | Sarnacke ............. G07C 5/0808 713/185 |

(Continued)

FOREIGN PATENT DOCUMENTS

| CN | 1574797 | 2/2005 |
| CN | 101431531 | 5/2009 |

(Continued)

OTHER PUBLICATIONS

International Search Report and Written Opinion, International Application No. PCT/US2013/032882, Date of mailing: Dec. 27, 2013, pp. 1-8.

(Continued)

*Primary Examiner* — Tuan H Nguyen
(74) *Attorney, Agent, or Firm* — HP Patent Department (57) ABSTRACT

An interconnect assembly is disclosed herein. An example includes a wireless connector to wirelessly transceive data to and from a first device and a connector to transceive data to and from a second device. The interconnect assembly additionally includes an interface selector to establish a communications protocol to exchange the data between the first device and the second device.

20 Claims, 12 Drawing Sheets

(56) References Cited

U.S. PATENT DOCUMENTS

| | | | |
|---|---|---|---|
| 2011/0199931 A1 | 8/2011 | Anderson et al. | |
| 2013/0057912 A1* | 3/2013 | Park | H04L 63/102 |
| | | | 358/1.15 |
| 2013/0304142 A1* | 11/2013 | Curtin | A61N 1/3975 |
| | | | 607/5 |

FOREIGN PATENT DOCUMENTS

| | | | | |
|---|---|---|---|---|
| CN | 101715185 | | 5/2010 | |
| CN | 102215149 | | 10/2011 | |
| CN | 202615186 | | 12/2012 | |
| KR | 10-2003-0067159 A | | 8/2003 | |
| KR | 10-2005-0078922 A | | 8/2005 | |
| KR | 10-0641228 B1 | | 6/2006 | |
| KR | 20060068603 | * | 6/2006 | ............... H04B 1/40 |
| KR | 10-2011-0138881 A | | 12/2011 | |
| KR | 20110138881 | * | 12/2011 | ............ H04W 16/26 |
| WO | WO-03/024055 A1 | | 3/2003 | |

OTHER PUBLICATIONS

Jukka Ylitalo et al., "Dynamic Network Interface Selection in Multihomed Mobile Hosts," Proceedings of the 36th Hawaii International Conference on System Sciences (HICSS'03), 2003, pp. 1-10, IEEE.

WiGig—Wireless Gigabit Alliance, WiGig White Paper, Defining the Future of Multi-Gigabit Wireless Communications, Jul. 2010 (5 pages).

* cited by examiner

INTERCONNECT ASSEMBLY

BACKGROUND

Consumers appreciate ease of use and reliability in their devices. They also appreciate aesthetically pleasing designs. Businesses may, therefore, endeavor to create and provide devices directed toward one or more of these objectives.

BRIEF DESCRIPTION OF THE DRAWINGS

The following detailed description references the drawings, wherein.

DETAILED DESCRIPTION

Interconnect assemblies may include various mechanical components or elements, such as prongs, plugs, pins, or clips, which matingly engage a corresponding socket, aperture, opening or receptacle during connection. Examples of such interconnect assemblies include various cable assemblies (e.g., Universal Serial Bus, Video Graphics Array, High Definition Multimedia Interface, IEEE 1394, etc.) for use with devices, such as computers, tablets, mobile phones, televisions, and personal digital assistants.

The mechanical parts of these interconnect assemblies can be subject to damage and/or fatigue which can compromise the integrity of a connection. Additionally, dirt, debris, moisture, and other contaminants may collect on or enter such interconnect assemblies and their corresponding sockets, apertures, openings or receptacles which can render them, and/or any devices to which they are connected, inoperable. Furthermore, such interconnect assemblies and their corresponding sockets, apertures, openings and receptacles may detract from the aesthetics of a device for at least some consumers.

In some instances, it may be desirable to connect a device with other devices that do not necessarily utilize the same communications protocol. Allowing an end user of a device to easily accomplish this task would add to the versatility of such a device. In still other instances, it may be desirable to restrict which other devices a device may connect to by limiting the types of protocols this device may utilize to transceive data with other devices.

Figure 1:
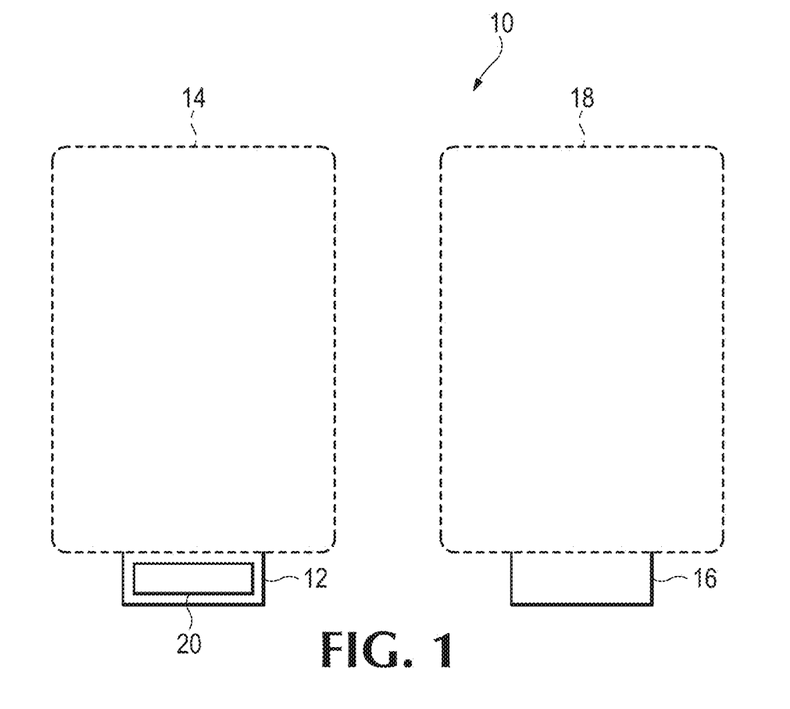
FIG. 1 is an example of an interconnect assembly.

An example of an interconnect assembly 10 that is directed to addressing these objectives is illustrated in FIG. 1. As used herein, the term "cable" is defined as including, but is not necessarily limited to, either (i) one or more wires or cables that transceive data in the form of signals and that may be covered or bound together by a sleeve, insulation, conduit, tape, one or more straps, etc. or (ii) a dongle.

As used herein, the term "dongle" is defined as including, but is not necessarily limited to, an apparatus that provides additional or enhanced functionality (e.g., additional memory, wireless connectivity, etc.) or an apparatus that facilitates the interface or connection between two different types of adapters, protocols, or power sources. Examples of dongles include, but are not limited to, flash memories, secure keys, and connection adapters.

As used herein, the term "transceive" is defined as including both transmission and reception of data in the form of one or more signals. As used herein, the terms "wireless" and "wirelessly" are defined as including, but are not necessarily limited to, a connection or coupling that does not require mechanical components or elements such as prongs, plugs, pins, or clips that matingly engage a corresponding socket, aperture, opening or receptacle. Wireless connections and couplings may operate in any of a variety of different frequency ranges and wavelengths. They may also be established electrically, magnetically, or optically.

As used herein, the term "communications protocol" is defined as including, but is not necessarily limited to, a format, syntax, and signaling arrangement utilized to transceive data to and from devices. Examples of various communications protocols include, but are not limited to, hypertext transfer protocol (HTTP), file transfer protocol (FTP), universal serial bus (USB) packet identifier (PID) bytes, IEEE 802.11, high-definition multimedia interface (HDMI), etc.

As used herein, the term "user interface" is defined as including, but not necessarily limited to, any graphical, textual and/or auditory medium that permits communications protocols to be viewed, sorted, searched and/or selected via use of one or more input devices such as a keyboard, mouse, touch screen, or microphone. As used herein, the term "device" is defined as including, but is not necessarily limited to, a computer, tablet, mobile phone, television, personal digital assistant, monitor, display, audio component, peripheral, dock, sleeve, docking station, or appliance.

As used herein, the terms "near field communication" and "NFC" are defined as including, but are not necessarily limited to, a technology for devices to establish communication with each other by touching them together or bringing them into close proximity (e.g., a distance of approximately four (4) centimeters (cm) or less). This communication can be encrypted or unencrypted. This communication may also be established over radio frequencies (e.g., 13.56 megahertz (MHz) on an ISO/IEC 18000-3 air interface) and at varying data rates (e.g., 106 Kbits/sec. to 424 Kbits/sec.). Near field communication devices can engage in two-way communication with one another, as well as one-way communication with near field communication data tags. Portions of near field communication technology have been approved as standards (e.g., ISO/IEC 18092/ECMA-340 and ISO/IEC 21481/ECMA-352).

As used herein, the terms "near field communication data tag" and "NFC data tag" are defined as including, but are not necessarily limited to, a near field communication device that contains or stores one or more scripts and/or data. These scripts and/or data may be read-only or rewriteable. As used herein, the terms 'near field communication reader" and "NFC reader" are defined as including, but are not necessarily limited to, a device that reads or decodes information on an NFC data tag.

Referring again to FIG. 1, interconnect assembly 10 includes a wireless connector 12 to wirelessly transceive data to and from a first device 14. Interconnect assembly 10 also includes a connector 16 to transceive data to and from a second device 18 and an interface selector 20 to establish a communication protocol to exchange data between first device 14 and second device 18.

Figure 2:
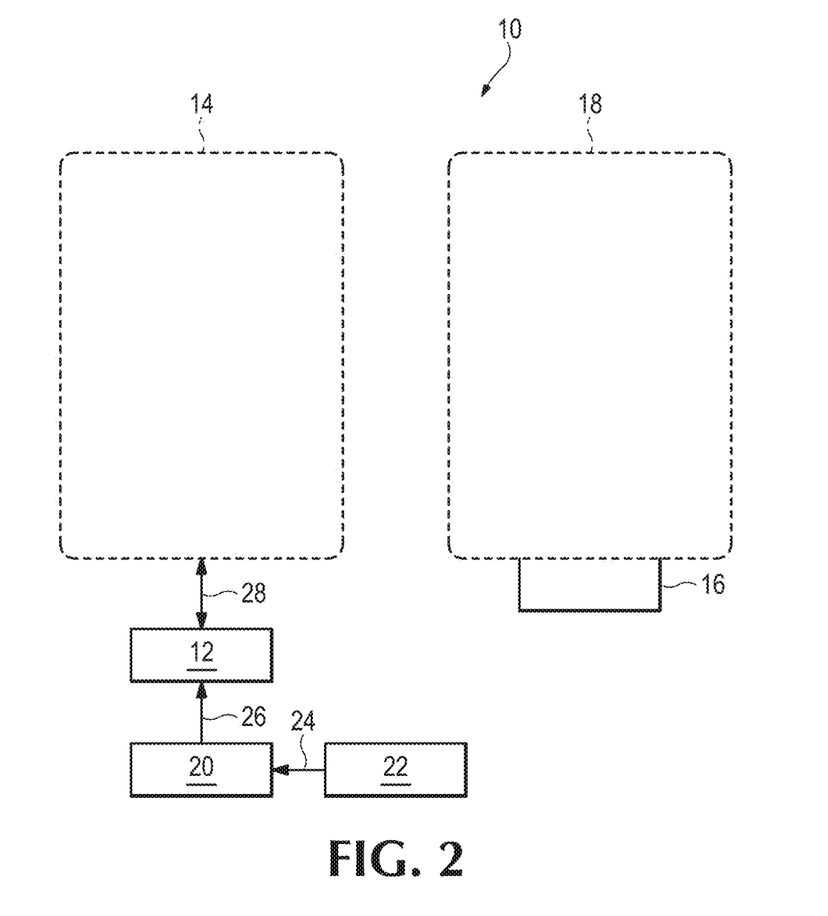
FIG. 2 is an example of a group of protocol formats for use by an interface selector of the interconnect assembly of FIG. 1.

An example of a group of different communications protocol formats 22 for use by interface selector 20 of interconnect assembly 10 is shown in FIG. 2. As can be seen in FIG. 2, interface selector 20 chooses one of the communications protocol formats from group 22, as generally indicated by arrow 24, to establish the communications protocol via wireless connector 12 and connector 16, as generally indicated by arrow 26, between first device 14 and second device 18, as generally indicated by double-headed arrow 28. In some cases, group of different communications protocol formats 22 may include a first set of data communications protocol formats and a second set of video communications protocol formats. In other cases, group of different communications protocol formats 22 may include other sets or different sets of communications protocol formats (e.g., audio communications protocol formats).

Figure 3:
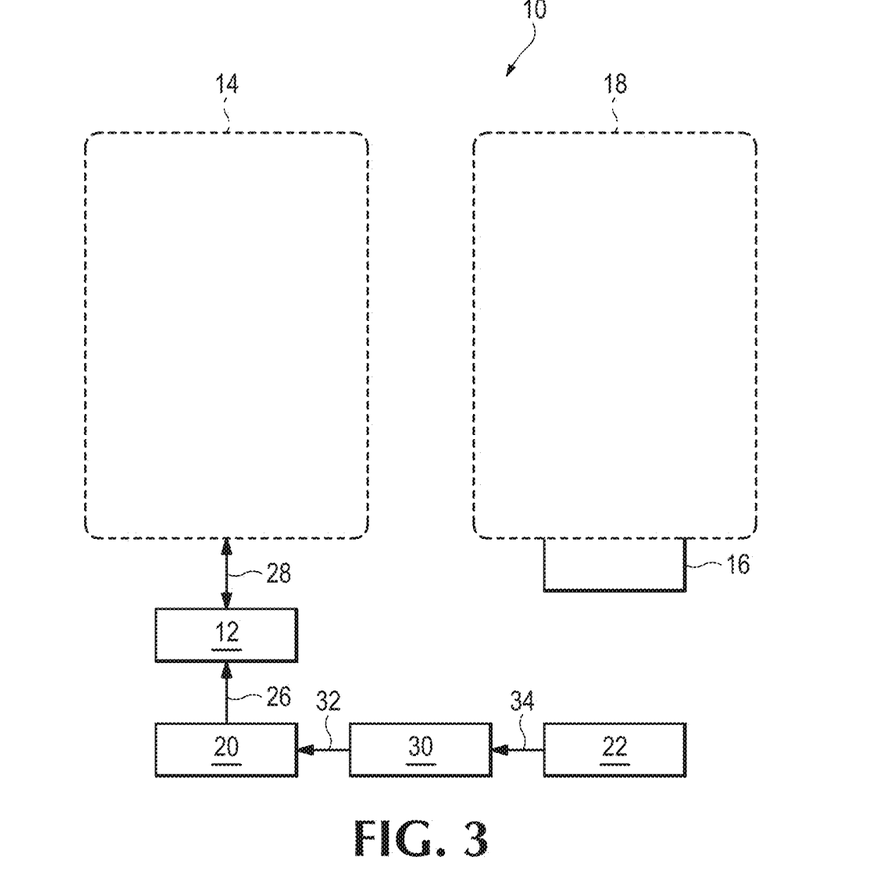
FIG. 3 is an example of a security module for use by the interconnect assembly of FIG. 1.

An example of a security module 30 for use by interconnect assembly 10 is shown in FIG. 3. Security module 30 is utilized to control which of the different communications protocol formats in group 22 that interface selector 20 may choose, as generally indicated by arrow 32, to establish the communications protocol between first device 14 and second device 18. This control or filtering performed by security module 30 is generally indicated by arrow 34. Security module 30 may be utilized to restrict the types of connections that first device 14 may establish. For example, security module 30 may be utilized to restrict first device 14 from accessing the internet by blocking the various types of protocols utilized for such data exchange, such as hypertext transfer protocol (HTTP) or hypertext transfer protocol secure (HTTPS). Additionally or alternatively, security module 30 may be utilized to restrict the types of devices to which first device 14 may establish a connection. For example, security module 30 may be utilized to restrict first device 14 from accessing video devices by blocking the various types of protocols utilized for data exchange by such devices, such as those protocols associated with high-definition multimedia interface (HDMI) or digital visual interface (DVI).

Connector 16 may also be wireless to wirelessly transceive data to and from second device 18. In some examples, wireless connectors 12 and 16 of interconnect assembly 10 may operate in the extremely high frequency (EHF) range. In other examples, wireless connectors 12 and 16 of interconnect assembly 10 may operate substantially at sixty (60) gigahertz (GHz). In still other examples, wireless connectors 12 and 16 of interconnect assembly 10 may operate substantially in an infrared frequency range. This use of such wireless technology for connectors 12 and 16 helps to eliminate the issues, described above, associated with interconnect assemblies that utilize mechanical components.

Figure 4:
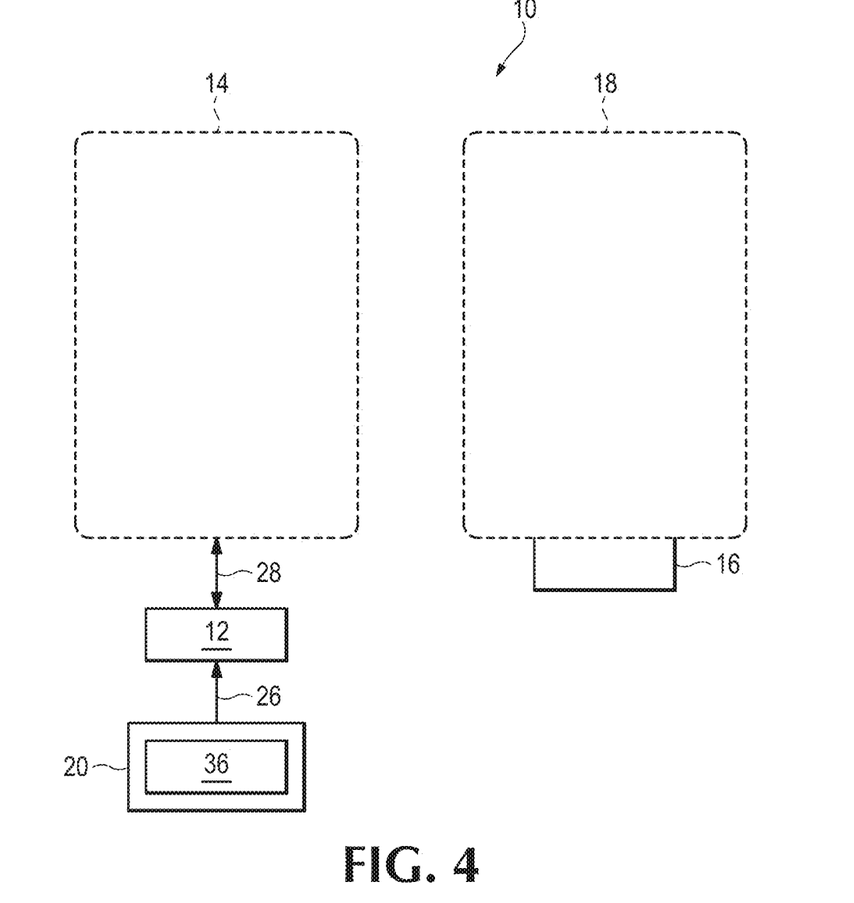
FIG. 4 is an example of a keying mechanism of an interface selector of the interconnect assembly of FIG. 1.

An example of a keying mechanism 36 of interface selector 20 of interconnect assembly 10 is shown in FIG. 4. Keying mechanism 36 automatically chooses the communication protocol between first device 14 and second device 18 which provides the benefits of time savings and convenience to the end-user of first device 14. Keying mechanism 36 may be located in wireless connector 12, first device 14, connector 16, and/or second device 18.

Figure 5:
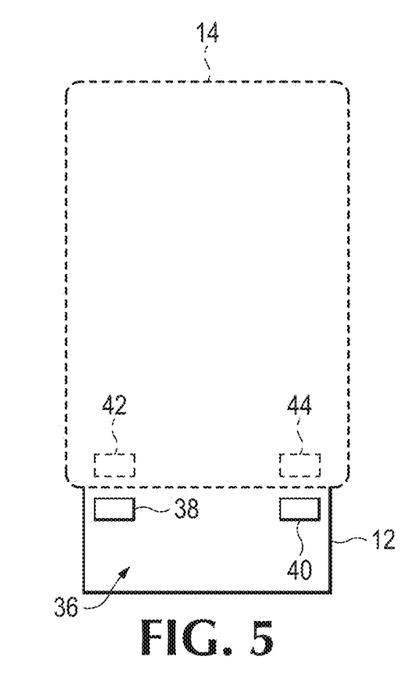
FIG. 5 is an example of an implementation of the keying mechanism of FIG. 4.

An example of an implementation of keying mechanism 36 is shown in FIG. 5. As can be seen in FIG. 5, keying mechanism 36 includes a predetermined arrangement of magnets 38 and 40 in wireless connector 12 as well as magnets 42 and 44 in first device 14. Magnets 38, 40, 42, and 44 of keying mechanism 36 also help to attach and align wireless connector 12 to first device 14. Although a pair of magnets 38 and 40 in wireless connector 12 and a pair of magnets 42 and 44 in first device 14 are shown in the example of FIG. 5, it is to be understood that a different number and/or arrangement of magnets may be used in other examples. For instance, a single magnet could be used in wireless connector 12 along with a single magnet in first device 14. As another example, more than two magnets may be used in wireless connector 12 and/or first device 14. As a further example, a pair of magnets in connector 16 and a pair of magnets in second device 18 may be used instead.

Figure 6:
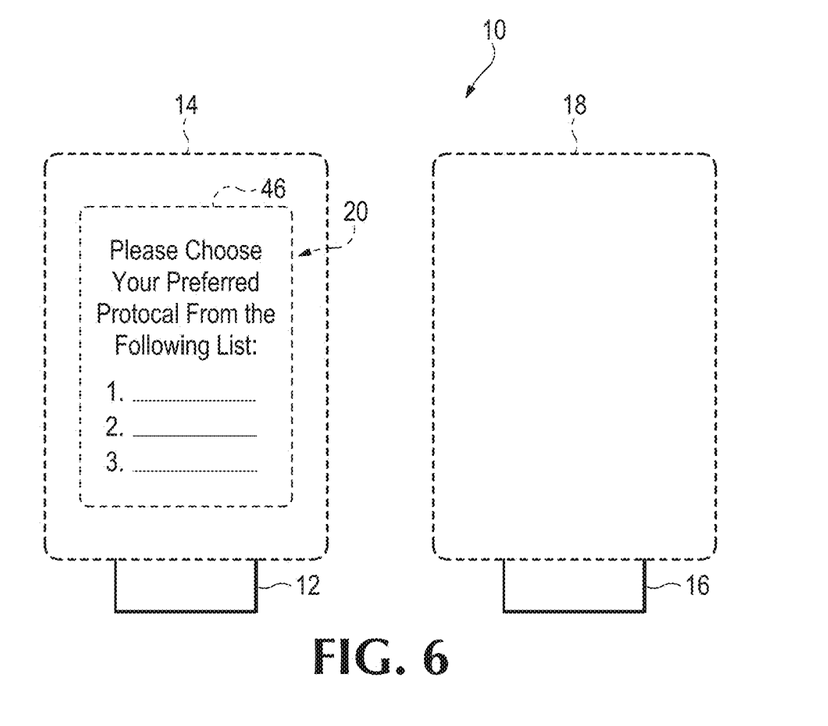
FIG. 6 is an example of an implementation of the interface selector of the interconnect assembly of FIG. 1.

An example of an implementation of interface selector 20 of interconnect assembly 10 is shown in FIG. 6. As can be seen in FIG. 6, in this example, interface selector 20 includes a user interface 46 in first device 14 to manually choose the communication protocol between first device 14 and second device 18. In this example, an end-user of first device 14 is presented with a menu or pop-up of three different communication protocols to choose from, the selection of which may depend on the characteristics of second device 18. Although not shown in FIG. 6, it is to be understood that in other examples of interface selector 20, user interface 46 may be alternatively or additionally located in second device 18. Allowing an end-user this range of choices via user interface 46 of interconnect assembly 10 adds versatility and provides for the possibility of adding different or additional protocols to support other types of existing or future-developed devices and technology.

Figure 7:
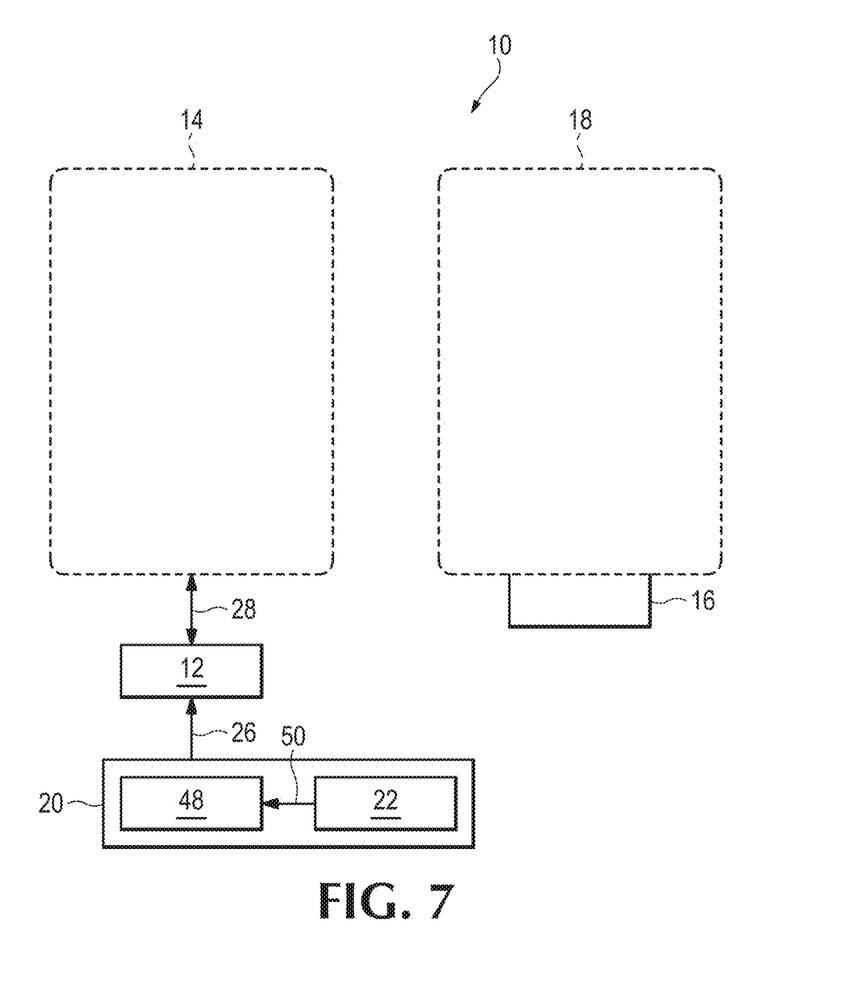
FIG. 7 is another example of an implementation of the interface selector of the interconnect assembly of FIG. 1.

Another example of an implementation of interface selector 20 of interconnect assembly 10 is shown in FIG. 7. As can be seen in FIG. 7, in this example, interface selector 20 includes a switch assembly 48 to manually choose the communications protocol between first device 14 and second device 18. An end-user of device 14 sets or positions switch assembly 48 to select one of the protocols from group of communications protocol formats 22, as generally indicated by arrow 50. Although not shown in FIG. 7, it is to be understood that in other examples of interface selector 20, switch assembly 48 may be alternatively or additionally located in connector 16. Allowing an end-user this range of choices via switch assembly 48 of interconnect assembly 10 adds versatility.

Figure 8:
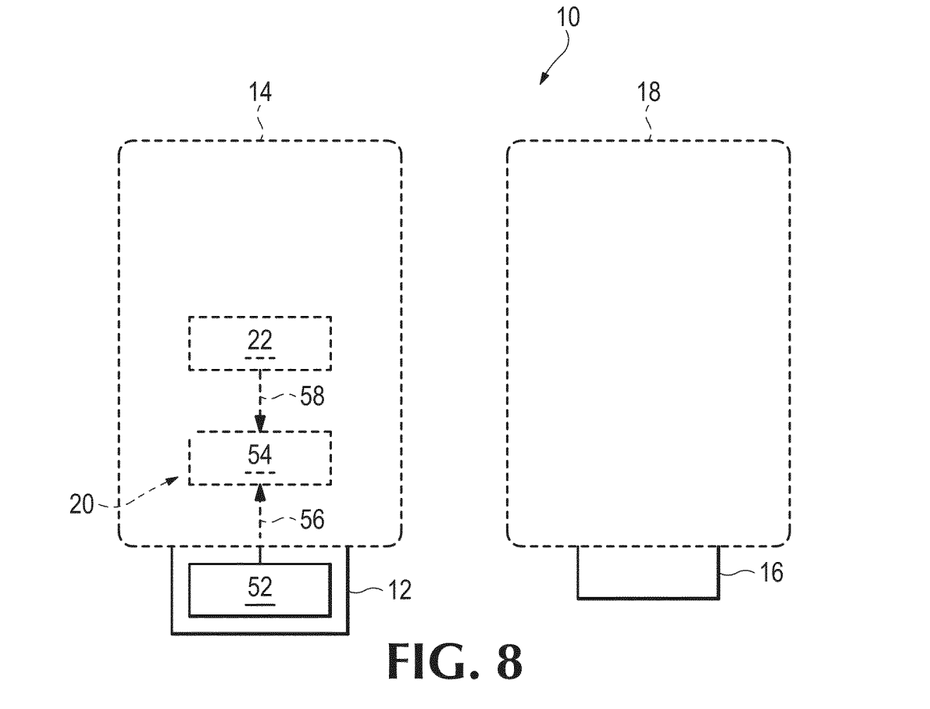
FIG. 8 is an additional example of an implementation of the interface selector of the interconnect assembly of FIG. 1.

An additional example of an implementation of interface selector 20 of interconnect assembly 10 is shown in FIG. 8. As can be seen in FIG. 8, in this example, interface selector 20 includes a near field communication (NFC) data tag 52 in wireless connector 12 and a near field communication (NFC) reader 54 in first device 14 that ascertains the communications protocol to be utilized based on information stored on NFC data tag 52, as generally indicated by arrow 56. NFC reader 54 then selects the ascertained communication protocol from group of communications protocol formats 22, as generally indicated by arrow 58. Although not shown in FIG. 8, it is to be understood that in other examples of interface selector 20, NFC data tag 52 may alternatively be located in connector 16 and NFC reader 54 may alternatively be located in second device 18. Use of NFC data tag 52 provides versatility to interface selector 20 of interconnect assembly 10 by providing for the possibility of adding different or additional protocols (through an update to NFC data tag 52) to support other types of existing or future developed devices and technology.

Figure 9:
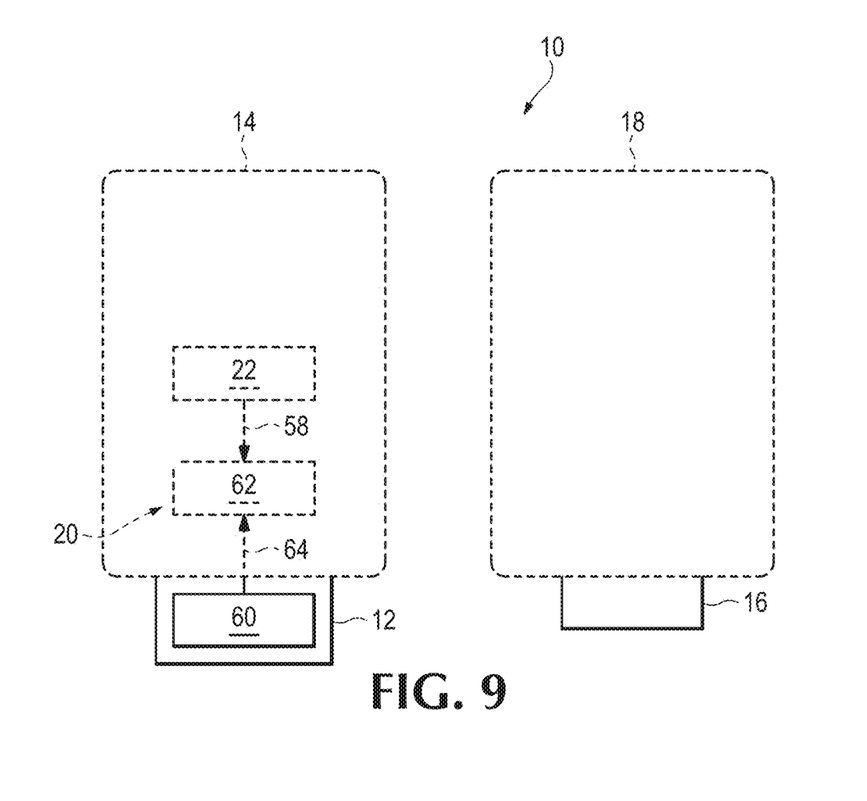
FIG. 9 is a further example of an implementation of the interface selector of the interconnect assembly of FIG. 1.

A further example of an implementation of interface selector 20 of interconnect assembly 10 is shown in FIG. 9. As can be seen in FIG. 9, in this example, interface selector 20 includes an optical emitter 60 in wireless connector 12 and an optical detector 62 in first device 14 to create an optical coupling, as generally indicated by arrow 64. A communication protocol is then selected from group of communications protocol formats 22 based on this optical coupling, as generally indicated by arrow 58. Although not shown in FIG. 9, it is to be understood that in other examples of interface selector 20, optical emitter 60 may alternatively be located in connector 16 and optical detector 62 may alternatively be located in second device 18.

Figure 10:
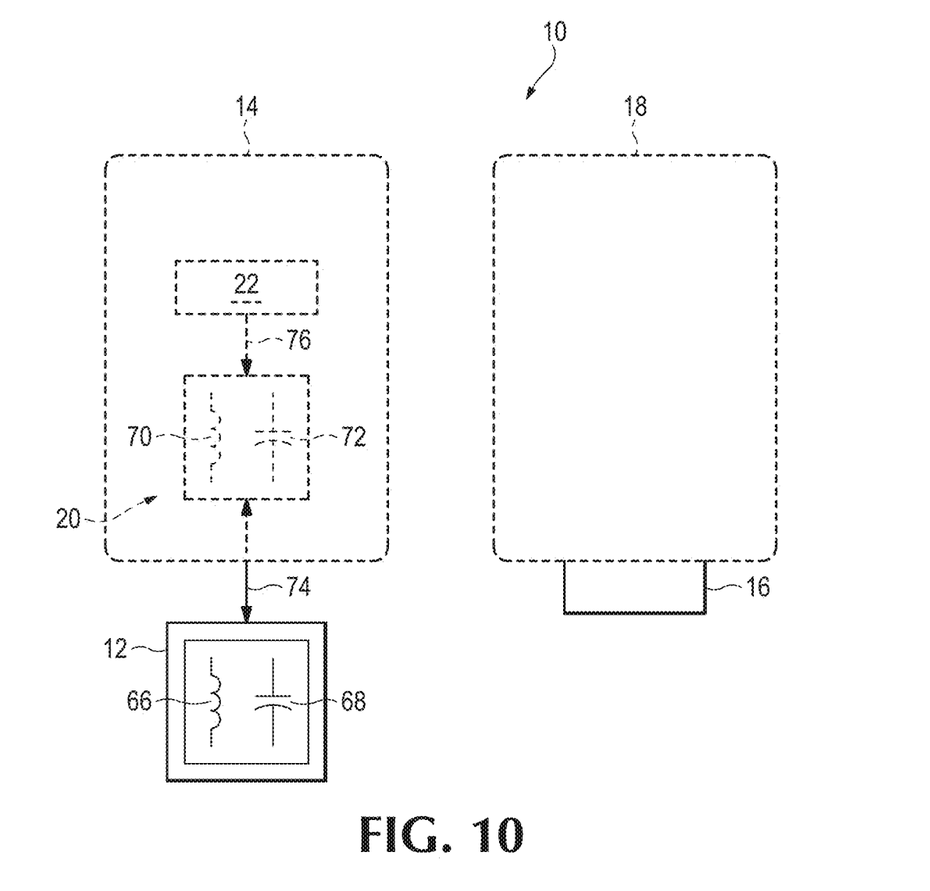
FIG. 10 is a still further example of an implementation of the interface selector of the interconnect assembly of FIG. 1.

A still further example of an implementation of interface selector 20 of interconnect assembly 10 is shown in FIG. 10. As can be seen in FIG. 10, in this example, interface selector 20 includes either a first inductive member 66 or a first capacitive member 68 in wireless connector 12 and either a corresponding second inductive member 70 or a second capacitive member 72 in first device 14 to create either an inductive coupling or a capacitive coupling, as generally indicated by double-headed arrow 74. A communication protocol is then selected from group of communications protocol formats 22 based on this inductive or capacitive coupling, as generally indicated by arrow 76. Although not shown in FIG. 10, it is to be understood that in other examples of interface selector 20, first inductive member 66 or first capacitive member 68 may alternatively be located in connector 16 and second inductive member 70 or second capacitive member 72 may alternatively be located in second device 18.

Figure 11:
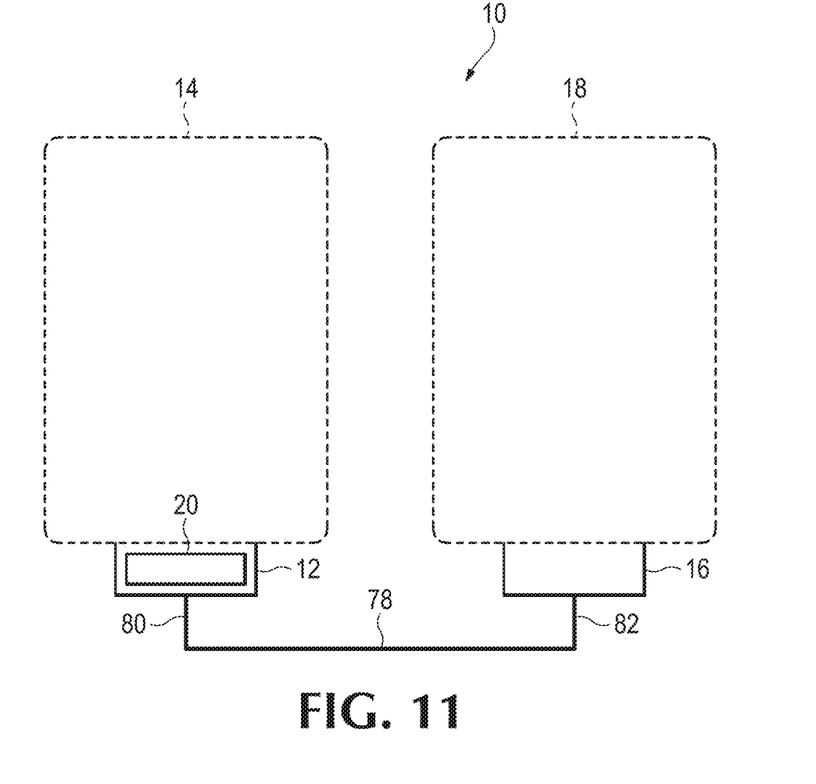
FIG. 11 is an example of the use of a cable with the interconnect assembly of FIG. 1.

An example of the use of a cable 78 with interconnect assembly 10 is shown in FIG. 11. As can be seen in FIG. 11, cable 78 includes a first end 80 to which wireless connector 12 is coupled and a second end 82 to which connector 16 is coupled. Although not shown in FIG. 11, it is to be understood that in other examples of use of cable 78 with interconnect assembly 10, second end 82 may be hard wired to second device 18. That is, second end 82 may be permanently retained or attached to second device 18 and not intended to be removed by an end-user of second device 18. This type of connection may be established in a variety of different ways such as, for example, directly soldering second end 82 to an input/output controller of second device 18 or through the use of a connector at second end 82 of cable 78 that is held captive by second device 18.

Figure 12:
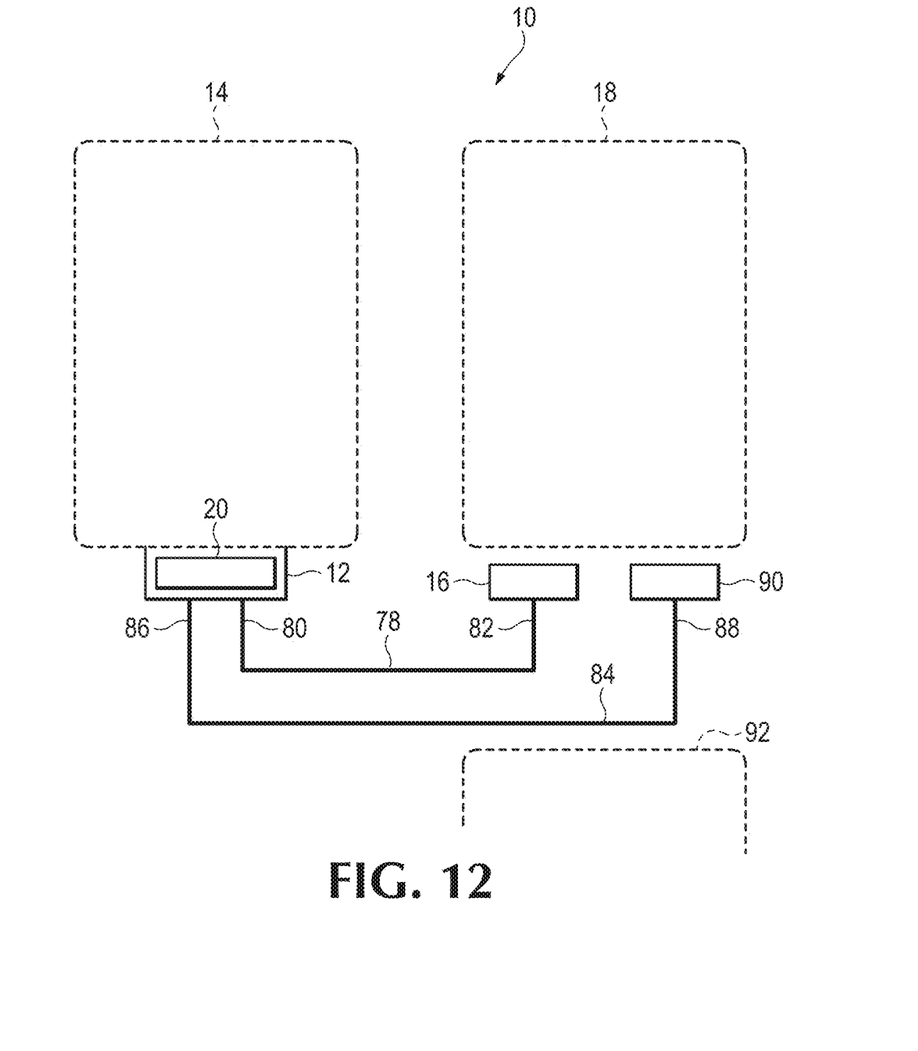
FIG. 12 is an example of the use of a second cable with the interconnect assembly of FIG. 11.

An example of the use of a second cable 84 with interconnect assembly 10 is shown in FIG. 12. As can be seen in FIG. 12, second cable 84 includes a third end 86 coupled to wireless connector 12 and a fourth end 88 at which a second connector 90 is located to transceive data to and from second device 18. In this example of interconnect assembly 10, interface selector 20 can establish a communications protocol to exchange data between first device 14 and second device 18 via either wireless connector 12, connector 16, and cable 78 or wireless connector 12, second connector 90 and second cable 84. This communications protocol established via either wireless connector 12, connector 16, and cable 78 or wireless connector 12, second connector 90 and second cable 84 can be the same or different.

Use of second cable 84 and second connector 90 allows interconnect assembly 10 to be used with a third device 92. This provides a range of possibilities for end-users such as, for example, simultaneous use of first device 14 with both second device 18 and third device 92. In such cases, multiplexing technology may be required to allow first device 14 to transceive data to and from respective second and third devices 18 and 92. If present, such multiplexing technology could be included in wireless connector 12 and/or first device 14.

Although several examples have been described and illustrated in detail, it is to be clearly understood that the same are intended by way of illustration and example only. These examples are not intended to be exhaustive or to limit the invention to the precise form or to the exemplary embodiments disclosed. Modifications and variations may well be apparent to those of ordinary skill in the art.

Additionally, reference to an element in the singular is not intended to mean one and only one, unless explicitly so stated, but rather means one or more. Moreover, no element or component is intended to be dedicated to the public regardless of whether the element or component is explicitly recited in the following claims.

What is claimed is:

1. An interconnect assembly, comprising:
   a first wireless connector to wirelessly transceive data to and from a first device;
   a second wireless connector to wirelessly transceive data to and from a second device;
   a security module to set a restriction that restricts a type of connection or a type of device to which the first device is able to establish a connection; and
   an interface selector to establish a communications protocol to exchange data between the first device and the second device through the first and second wireless connectors, the interface selector to establish the communications protocol by choosing, based on the restriction set by the security module, a communications protocol format from a group of different communications protocol formats.

2. The interconnect assembly of claim 1, wherein the group of different communications protocol formats includes a first set of data communications protocol formats and a second set of video communications protocol formats.

3. The interconnect assembly of claim 1, wherein the first and second wireless connectors are to operate in an extremely high frequency (EHF) range.

4. The interconnect assembly of claim 1, wherein the first and second wireless connectors are to operate substantially at sixty (60) gigahertz (GHz).

5. The interconnect assembly of claim 1, wherein the first and second wireless connectors are to operate in an infrared frequency range.

6. The interconnect assembly of claim 1, wherein the interface selector includes a keying mechanism in at least one of the first and second wireless connectors, the choosing of the communications protocol format from the group of different communications protocol formats based on the keying mechanism.

7. The interconnect assembly of claim 6, wherein the keying mechanism includes an arrangement of magnets, the choosing of the communications protocol format from the group of different communications protocol formats based on the arrangement of magnets.

8. The interconnect assembly of claim 1, wherein the interface selector includes a switch assembly in at least one of the first and second wireless connectors, the switch assembly being user-actuatable to select from the group of different communications protocol formats.

9. The interconnect assembly of claim 1, wherein the interface selector includes a near field communication data tag in one of the first and second wireless connectors, and a near field communication reader in one of the first device and the second device.

10. The interconnect assembly of claim 1, wherein the interface selector includes an optical emitter in one of the first and second wireless connectors, and an optical detector in one of the first device and the second device to create an optical coupling.

11. The interconnect assembly of claim 1, wherein the interface selector includes a first inductive member in one of the first and second wireless connectors, and a second inductive member in one of the first device and the second device to create an inductive coupling.

12. The interconnect assembly of claim 1, wherein the interface selector includes a first capacitive member in one of the first and second wireless connectors, and a second capacitive member in one of the first device and the second device to create a capacitive coupling.

13. The interconnect assembly of claim 1, further comprising a first cable including a first end and a second end, and wherein the first wireless connector is connected to the first end of the first cable, and the second wireless connector is connected to the second end of the first cable.

14. The interconnect assembly of claim 13, further comprising:
a second cable including a third end coupled to the first wireless connector and a fourth end; and
a further connector at the fourth end of the second cable to transceive data to and from the second device.

15. The interconnect assembly of claim 14, wherein the communications protocol established via the first and second wireless connectors and the first cable is different than a communications protocol established via the first wireless connector, the further connector, and the second cable.

16. The interconnect assembly of claim 1, wherein the choosing of the chosen communications protocol format used in the exchange of data between the first device and the second device comprises:
choosing a first communications protocol format of the group of different communications protocol formats in response to determining that the exchange of data between the first device and the second device is subject to the restriction; and
choosing a different second communications protocol format of the group of different communications protocol formats in response to determining that the exchange of data between the first device and the second device is not subject to the restriction.

17. A method comprising:
wirelessly transceiving, by a first wireless connector of an interconnect assembly, data to and from a first device;
wirelessly transceiving, by a second wireless connector of the interconnect assembly, data to and from a second device; and
establishing, by an interface selector of the interconnect assembly, a communications protocol to exchange data between the first device and the second device through the first and second wireless connectors, the establishing of the communications protocol comprising choosing a communications protocol format from a group of different communications protocol formats based on a restriction set by a security module, the restriction restricting a type of connection or a type of device to which the first device is able to establish a connection, the chosen communications protocol format used in the exchange of data between the first device and the second device.

18. The method of claim 17, wherein the choosing of the chosen communications protocol format used in the exchange of data between the first device and the second device comprises:
choosing a first communications protocol format of the group of different communications protocol formats in response to determining that the exchange of data between the first device and the second device is subject to the restriction; and
choosing a different second communications protocol format of the group of different communications protocol formats in response to determining that the exchange of data between the first device and the second device is not subject to the restriction.

19. A system comprising:
a first device;
a second device; and
an interconnect assembly to communicatively interconnect the first device and the second device, the interconnect assembly comprising:
a first wireless connector to wirelessly transceive data to and from the first device;
a second wireless connector to wirelessly transceive data to and from the second device; and
an interface selector to establish a communications protocol to exchange data between the first device and the second device through the first and second wireless connectors, the interface selector to establish the communications protocol by choosing a communications protocol format from a group of different communications protocol formats, based on a restriction set by a security module, the restriction restricting a type of connection or a type of device to which the first device is able to establish a connection, the chosen communications protocol format for use in the exchange of data between the first device and the second device.

20. The system of claim 19, wherein the first and second wireless connectors are to wirelessly transceive data in a particular frequency range.

* * * * *